United States Patent Office 2,758,984
Patented Aug. 14, 1956

2,758,984

PROCESS FOR MAKING DESTATICIZED PLASTIC

Myron A. Coler, New York, N. Y.

No Drawing. Application July 15, 1952,
Serial No. 299,023

4 Claims. (Cl. 260—43)

This invention relates to improved compositions and method of making such compositions for molding of destaticized plastic articles. The term "plastic" as used herein embraces any one of a large and varied group of materials commonly referred to as plastics and resins, such as polymethylmethacrylate, polyvinylidene chloride, polyethylene, polystyrene, polyvinylchloride and their copolymers.

Most molded plastic articles made from the above mentioned materials have electrostatic charges built up upon ejection from the mold. The presence of the charges causes the attraction of dust, lint and other fine debris which render the article unsightly. Invariably, attempts to wipe the article so that it may be displayed for sale results in the generation of additional static charges with resultant dust attraction and scratching of the surface unless specifically treated cloths and extreme care are used.

The need for amelioration of the dust collecting tendencies of plastic articles has long been appreciated as evidenced by the extensive literature on the subject.

In general, the approaches of the prior art include the surface treatment of the molded article which is objectionable since a coating is provided which may inherently be undesirable; such a coating is of a temporary nature, and requires an additional handling operation. The beneficial effects of such treatments are basically temporary and exhibit poor resistance to ordinary wear and tear of every day use such as washing with soap and water. A still different approach has been the direct incorporation of a conductive material with the plastic molding material. In general, it has been found that if sufficient material is incorporated in this manner to provide even a minimum level of static dissipation, the properties of the plastic are adversely affected as by weakening of the structure.

This invention does not require treatment of the molded article and provides a means of incorporating a conductive material into the article so efficiently that an extremely small quantity can produce a destaticized molded plastic article without producing undesired changes in the physical properties of the plastic. Further, it has been found that the product of this invention retains antistatic properties for long periods despite washing with soap and water.

Accordingly, it is an object of this invention to provide a plastic article substantially non-susceptible to the accumulation of electrostatic charges.

Another object is to provide a material for incorporation with a plastic molding powder which will render a resulting molded article free of the effects of electrostatic charges.

Still another object is to provide a method of making a static dissipating plastic article.

A still different object is to provide a simple low cost method of producing static dissipating molded plastic articles.

It is a particular object of this invention to provide a plastic molding composition for injection molding articles having antistatic properties.

It is an object of this invention to provide a stable composition for molding of destaticized plastic articles.

Still further objects and advantages of this invention are made apparent by the following description.

In copending applications of Myron A. Coler and Arnold S. Louis for Non-Electrostatic Plastic Articles, Serial No. 291,815, and Non-Electrostatic Plastic Articles and Method of Making Same, Serial No. 295,838, it is shown that by treating certain finely divided sorbtive materials with appropriate destaticizing materials, in liquid form, the treated sorbtive materials may be mixed with comminuted plastic particles and molded to produce static dissipating plastic articles. I have also found that the resulting article will have a surprisingly high conductivity in relation to the amount of conductive material incorporated therein; and thus, by this technique it is possible to produce plastic products having relatively good static charge dissipation properties but structural properties substantially the same as those of the untreated plastic. The molding powder which results may be formed by conventional molding techniques into any of various desired solid void free shapes.

The method of the present invention is based on my discovery that it is possible to incorporate certain materials, more fully discussed later, so that the destaticizing systems of the referenced copending applications are formed during the molding operation. This provides several important advantages such as increased stability since evaporation of the destaticizing agent prior to molding is eliminated, and convenience of introduction into the molding plastic as is shown below.

In general, systems are incorporated in the plastic such that there are irreversibly formed under molding conditions, a finely divided sorbtive material and a destaticizing liquid, by reaction or decomposition. Compositions which will irreversibly form a destaticizing liquid but not a sorbtive material may be used provided there is also incorporated one of the sorbtive materials disclosed in a succeeding paragraph. The addition of material which will contribute ions to the destaticizing liquid is within the scope of this invention.

The materials added to serve as the source of sorbtive material and destaticizing liquid should be considerably finer than the comminuted plastic. Thus, it is preferred that the comminuted plastic be no finer than 100 mesh in particle size and that the added materials be no coarser than 200 mesh.

In one embodiment of this invention it is contemplated that comminuted particles of a thermoplastic material, such as polymethylmethacrylate or polystyrene be tumbled with a much more finely divided, uncured thermosetting resin which gives off water during cure, e. g., a typical phenol formaldehyde or urea formaldehyde. Under molding conditions the particles of thermosetting resin will be cured and the resulting water will be sorbed on the particle surfaces and interstices thus contributing destaticizing properties to the plastic. Additional binder material is contributed to the system in this fashion.

Similarly, alkyd type resinous condensation products and water may be formed in situ starting with polybasic acids such as phthalic and succinic acids and polyhydric alcohols such as glycerine, pentaerythritol and ethylene glycol. Be it noted that any unreacted materials will, in this case, contribute to the conductivity of the total system.

It is understood that various salts, acids, alcohols, amines, amides and other by-products may be formed during the progress of the above mentioned condensation reactions. These may contribute to the anti-static properties of the products of this invention.

Systems which react by saponification, salt formation, esterification and the like to form a finely divided solid substance and a destaticizing liquid may also be used.

In other embodiment the plastic particles are tumbled with finely divided hydrated lime or magnesia and a glyceride of a fatty acid or a mixture of fatty acids. Upon molding, there is formed a calcium and/or magnesium soap and glycerine, with or without water.

The plastic particles may also be tumbled with a reactive base such as slaked lime or magnesia and an acid which melts at molding temperature of the plastic, say, benzoic acid, abietic, stearic acid; with reactants preferably being in a finely divided form, considerably finer than the plastic. At molding temperature the acid melts, reacts with the oxide and provides finely divided salt and adsorbed water.

In the present application and particularly in the appended claims, the phrase "plastic in comminuted form" is used. It should be noted that the word "comminuted" merely indicates that the plastic is in a discrete particulate form and does not necessarily imply that this particulate form was arrived at by subdivision of larger plastic masses. Similarly, phrases such as "finely divided materials" are not intended to carry any implication as to the manner in which the fine state of subdivision is arrived at.

The term "sorbtive" as used herein is intended to embrace absorbtion, adsorption and other like processes by which a solid material and a liquid co-adhere.

As disclosed in the referenced copending applications, suitable sorbtive materials are those having the ability to hold considerable quantities of liquid destaticizing material under conditions of molding. They may be organic or inorganic and should have a large specific surface which may reside, in part, in extensive internal pores, such as occur in silica gel. Generally, finely divided sorbtive materials are preferred for the greater surface as compared to an equivalent quantity of coarser material. They should be stable under molding conditions and substantially non-reactive with the conductive material or plastic, nor should they be soluble in either. The sorbtive material should be readily wetted by the conductive material.

Some sorbtive materials may serve a dual purpose; for example, they may also serve as coloring pigments. Specifically, titanium dioxide, copper phthalocyanine, cadmium reds and yellow, chrome yellow and other white and colored materials in pigment form may be used. Diatomaceous earth is useful as a sorbtive material for translucent conductive compounds if a translucent conductive plastic is desired. Other suitable materials include silica gel, bentonite, clay and alumina hydrate. Wood flour, alpha cellulose, asbestos fibers and like finely divided filler materials can likewise serve as sorbtive materials. It should be noted that as normally compounded (e. g., by extrusion and chopping) in filled plastics, i. e., those containing such fillers, the fillers are not in a condition to receive the liquid destaticizing agent.

Preferred destaticizing materials are those which are liquid, are highly conductive, are non-reacting with the plastic or sorbtive material, are stable under molding conditions, and have low vapor pressure so as to minimize loss during molding as well as from the molded article. It is important that the destaticizing material be substantially insoluble in the plastic and/or the sorbtive agent, and, in turn, be substantially free of solvent properties for the same materials.

The destaticizing material may be inherently conductive or it may be a material that is rendered conductive by the ionization of a dissolved electrolyte.

Types of destaticizing liquids which have been found to be particularly useful in the practice of this invention include the amides, nitriles, nitro compounds, polyhydric alcohols and water. In general, the effectiveness of the active groups just mentioned decreases with the increasing size of attached alkyl or aryl radicals. The liquid should have a relatively low vapor pressure, otherwise the conductive material will evaporate during storage, particularly at high temperature and its beneficial effects will be lost. Thus, water answers the criterion of dielectric constant set up herein for the selection of conductive materials, but it has been found that moldings containing water as conductive material, lose their static dissipating properties after a few days storage at 113° F., presumably because of evaporation of the water. For a given conductive liquid, permanence will depend upon vapor pressure and heat of vaporization at working temperatures among other things. The permanence of a particular conductive liquid can be readily determined by experiment.

It should be understood that many liquids which have high dielectric constants are inherently non-conductive but are rendered conductive by the presence of small amounts of ionizable materials. Usually such ionizable substances are present as normal impurities in the commercially available forms of the liquids. Ionizable impurities may also be derived from the plastic or sorbtive particles which are used or by absorption from the air.

Where objects are to be formed by compression molding, I have found that the non-electrostatic plastic should contain from 3 to 60% of sorbtive material and preferably from 5 to 25% of sorbtive material by volume based on the quantity of insulator plastic present.

According to these limits the non-electrostatic plastic should contain 3 to 37% and preferably 5 to 20% of sorbtive material by volume.

Where objects are to be formed by injection molding, the nonelectrostatic plastic should contain from 3 to 60% of sorbtive material, preferably from 5 to 30% of sorbtive material by volume based on the quantity of insulator plastic present.

According to these limits the non-electrostatic plastic for injection molding should contain 3 to 37% and preferably 5 to 23% of sorbtive material by weight.

With the destaticizing systems of the present invention, the amount of destaticizing liquid will be determined primarily by the stoichiometry of the reactions involved. The quantities formed will, in general, be within a useful range for the combinations of materials mentioned above.

It is, of course, possible to combine the principles of the present invention and the cited copending applications by adding appropriate amounts of the destaticizing liquids and/or sorbtive materials mentioned herein.

In the molding of objects from the non-electrostatic plastics of this invention, it is preferred that a temperature in the lower part of the usual molding range for the corresponding insulator plastic be used in order to minimize vaporization losses of the destaticizing liquid.

In the molding of products of this invention I may prefer, in certain cases, to have the molding compound dwell in the mold at molding temperature for some time prior to the application of pressure.

The plastic which can be used in carrying out this invention may be chosen from the large group of molding substances including polystyrene, polymethylmethacrylate, polyethylene, polyvinyl chloride, polyvinylidene chloride, vinyl copolymers, etc. This listing is not intended to be limiting. The plastic particles may already contain compounding ingredients such as lubricants, plasticizers, dyes, pigments and fillers, like alpha-cellulose, wood flour and mica.

In order to point out more fully the nature of the present invention, the following is illustrative of procedures which may be used in the practice thereof.

100 grams of polystyrene beads sized to pass a 40 mesh screen and be retained on an 80 mesh screen, 10 grams of glyceryl stearate, 1.5 grams of finely divided slaked lime and 30 grams of pigment grade titanium dioxide may be charged to a one gallon jar and milled for one hour at 60 revolutions per minute. The resulting powder may be used for molding anti-static articles.

According to another procedure, 100 grams of similar polystyrene, 22 grams of benzoic acid ground to pass a 325 mesh screen and 6.5 grams of finely divided slaked lime may be milled as described above.

Again, 80 grams of similar polystyrene beads and 20 grams of uncured B-stage phenolic resin ground to pass a 325 mesh screen may be milled as described above to yield a molding compound of this invention.

Since many embodiments may be made of the present invention, within the scope of the appended claims, it is to be understood that the foregoing description is to be interpreted as illustrative only and not in a limiting sense.

I claim:
1. A molding composition comprising a major proportion of comminuted particles no finer than 100 mesh of a thermoplastic resin and from about 3% to 60% by volume of a finely divided solid material no coarser than 200 mesh characterized by irreversibly releasing water on curing and retaining said water in absorbed form when heated to the molding temperature of said thermoplastic resin, said solid material being insoluble in and non-reactive with said thermoplastic resin under molding conditions, and curing at said molding temperature, said solid material being selected from the group consisting of uncured urea aldehyde resin and uncured phenol aldehyde resin.
2. The composition of claim 1 wherein said thermoplastic resin is polystyrene.
3. The composition of claim 1 wherein said solid material is a partially cured phenol aldehyde resin.
4. The composition of claim 1 wherein said solid material is a partially cured phenol formaldehyde resin.

References Cited in the file of this patent

UNITED STATES PATENTS

| | | |
|---|---|---|
| 2,022,383 | Moss | Nov. 26, 1935 |
| 2,109,592 | Macht et al. | Mar. 1, 1938 |
| 2,384,947 | Matheson | Sept. 18, 1945 |
| 2,386,995 | Wigal | Oct. 16, 1945 |
| 2,396,098 | Haas | Mar. 5, 1946 |
| 2,409,548 | Debacher | Oct. 15, 1946 |
| 2,437,284 | Watson | Mar. 9, 1948 |
| 2,556,045 | Serdynsky et al. | June 5, 1951 |
| 2,624,725 | Bjorksten et al. | Jan. 6, 1953 |

FOREIGN PATENTS

| | | |
|---|---|---|
| 492,906 | Great Britain | Sept. 29, 1928 |
| 582,807 | Great Britain | Nov. 28, 1946 |